Patented Oct. 4, 1932

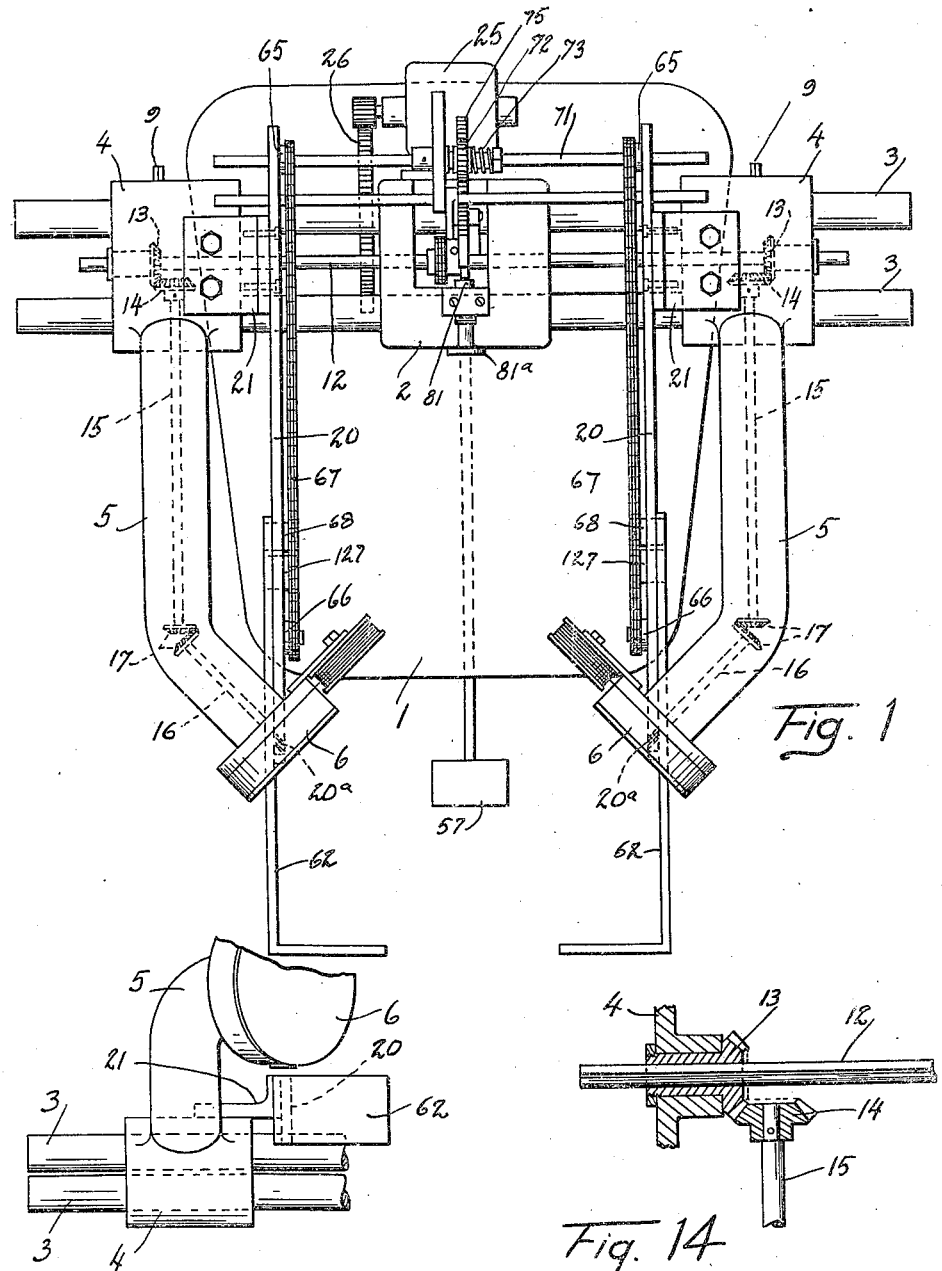

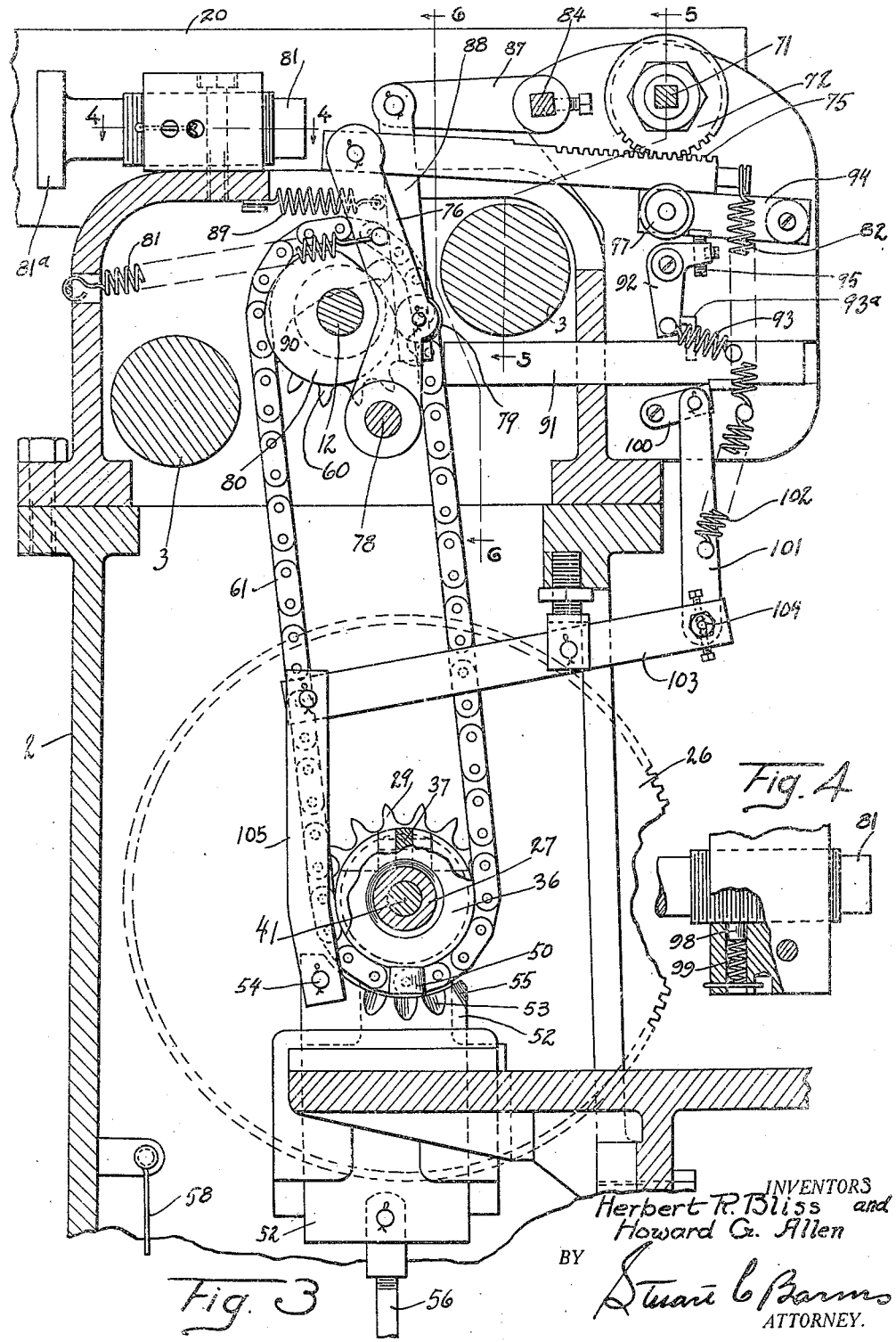

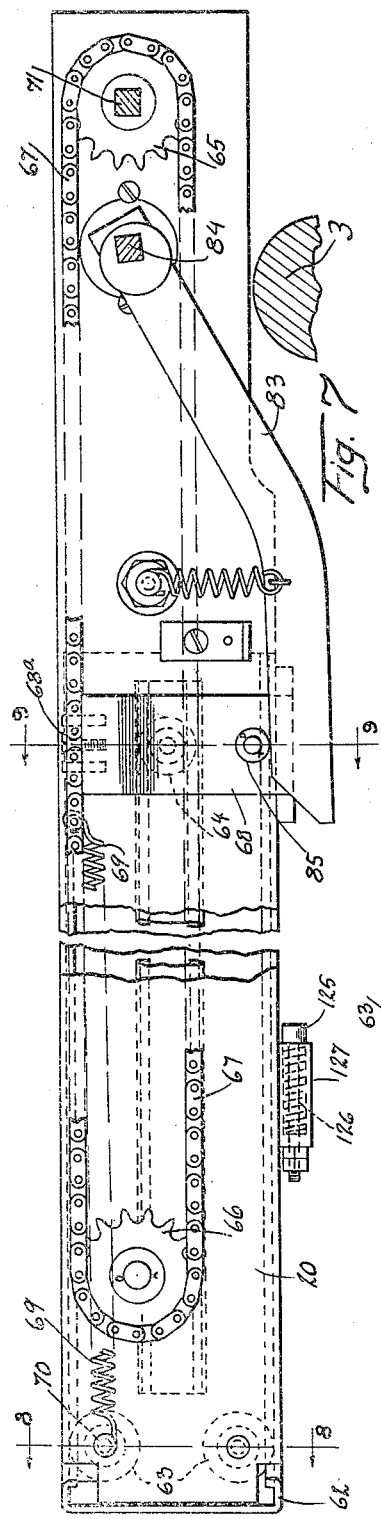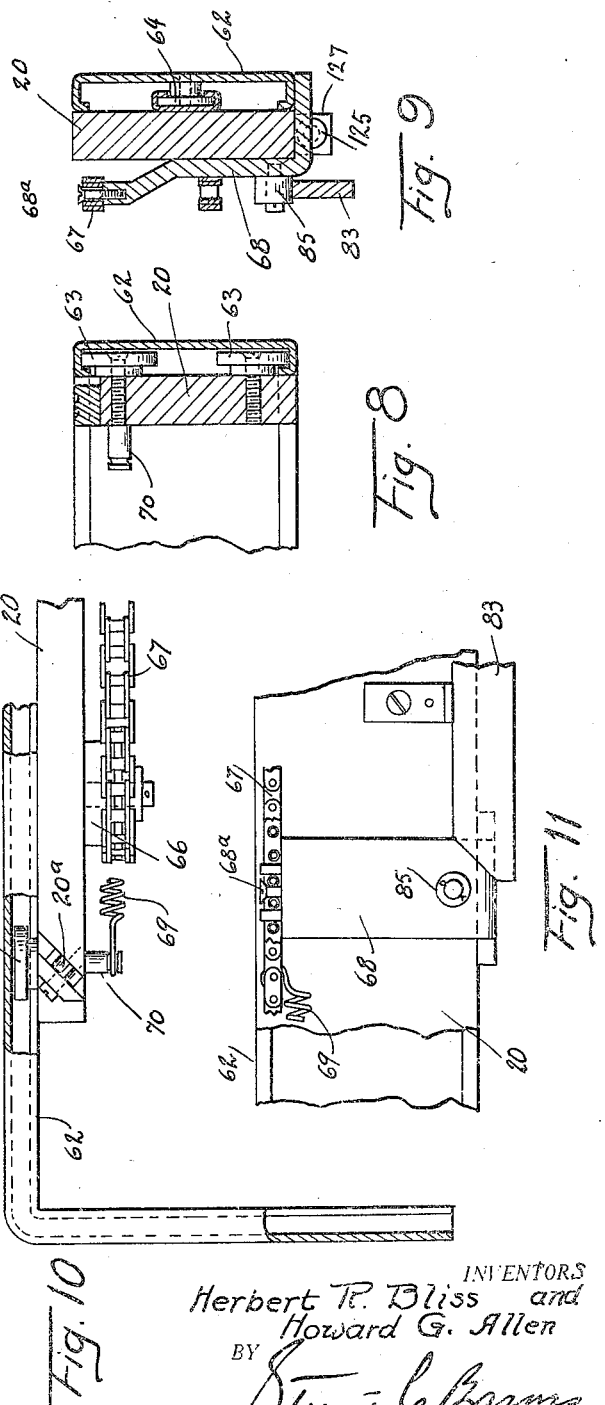

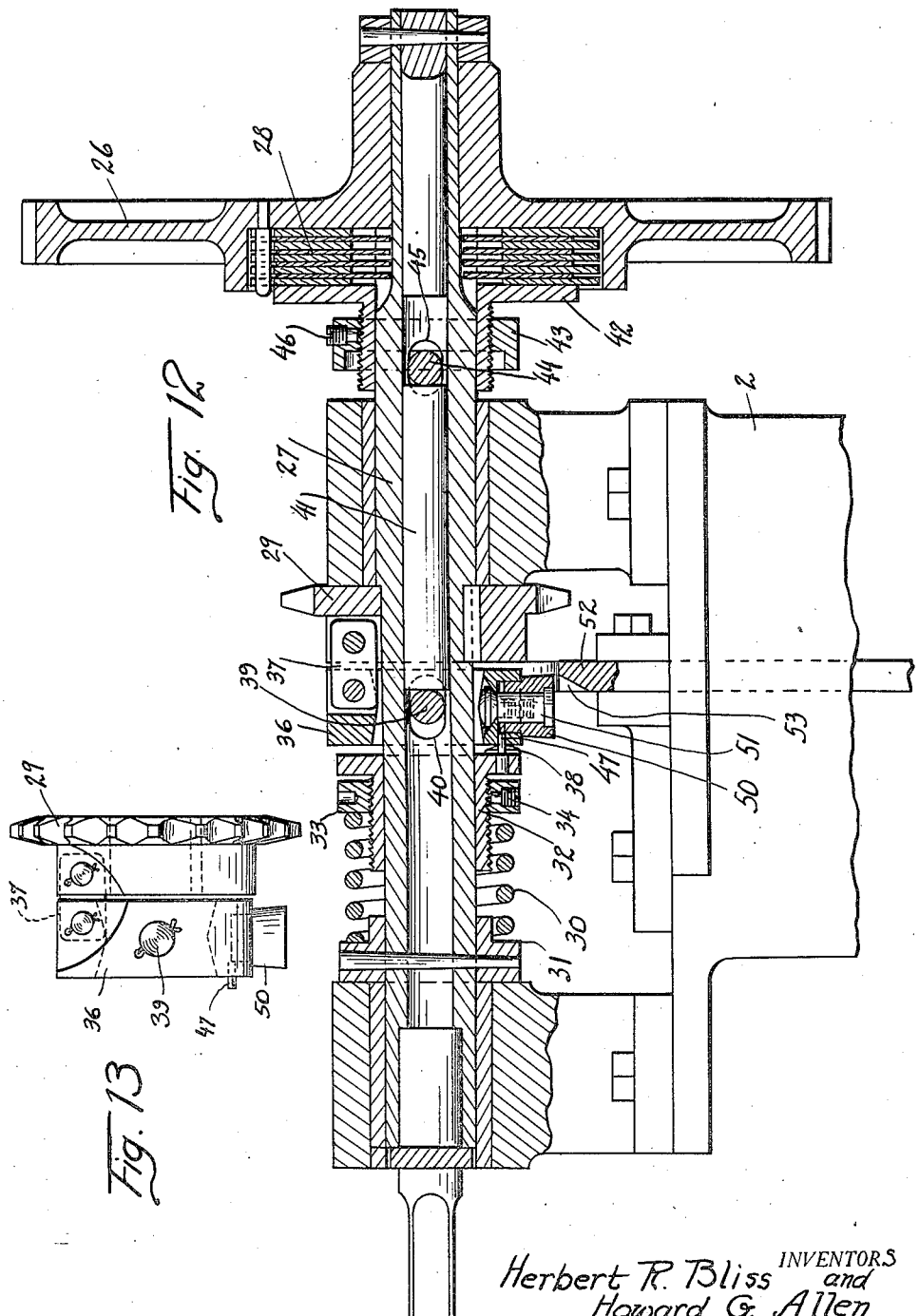

1,880,726

UNITED STATES PATENT OFFICE

HERBERT R. BLISS AND HOWARD G. ALLEN, OF NIAGARA FALLS, NEW YORK, ASSIGNORS TO H. R. BLISS CO., INC., OF NIAGARA FALLS, NEW YORK, A CORPORATION OF NEW YORK

STITCHING MACHINE

Application filed November 29, 1929. Serial No. 410,515.

This invention relates to a stitching machine suitable for taking wire stitches in containers of fibre board or the like, and it has to do especially with a double head stitcher arranged so that two stitches or two rows of stitches can be taken simultaneously.

The invention aims to provide a stitching machine wherein double stitcher heads are provided in a single machine and wherein the supporting frame structure is readily adjustable for moving the stitcher heads away or toward each other for containers of different dimensions, and wherein the operable mechanism of the stitcher head is at all times connected to a suitable power means for operation, which connection is not in any way disturbed by the adjustment. Another object is to provide a novel control mechanism which affords, among other things, for the positive feeding step by step, of the container or blanks being stitched so that rows of equally spaced stitches are taken; at the same time the mechanism is such as to permit the taking of some stitches, as for example a single stitch, prior to the setting in operation of this automatic step by step feeding mechanism. The purpose of this will be better understood as the description progresses.

Other objects of the invention will become apparent as the description progresses having reference to the drawings attached hereto wherein:—

Fig. 1 is a plan view of a double head stitching machine as contemplated by the invention showing some of the parts somewhat in diagrammatic form.

Fig. 2 is an enlarged detail illustrating a stitcher head and anvil.

Fig. 3 is a detail view in illustration of the driving mechanism and the feeding mechanism.

Fig. 4 is a detail section taken on line 4—4 of Fig. 3 with some parts cut away.

Fig. 7 is a view showing the mounting of the forms for feeding the container or blanks, and also showing a trip device which sets the feed mechanism into operation.

Figs. 8 and 9 are sectional views taken on section lines 8 and 9 respectively of Fig. 7.

Fig. 10 is a view somewhat enlarged illustrating in plan, with some parts cut away, the forward end of the blank supporting and feeding forms.

Fig. 11 in a detail view illustrating the position of some of the operating parts just prior to the throwing of the trip for setting the feed mechanism.

Fig. 12 is a sectional view taken through the drive shaft and clutch construction.

Fig. 13 is a view in side elevation of the driving sprocket and associated parts.

Fig. 14 is an enlarged detail of the drive construction.

Figure 15:
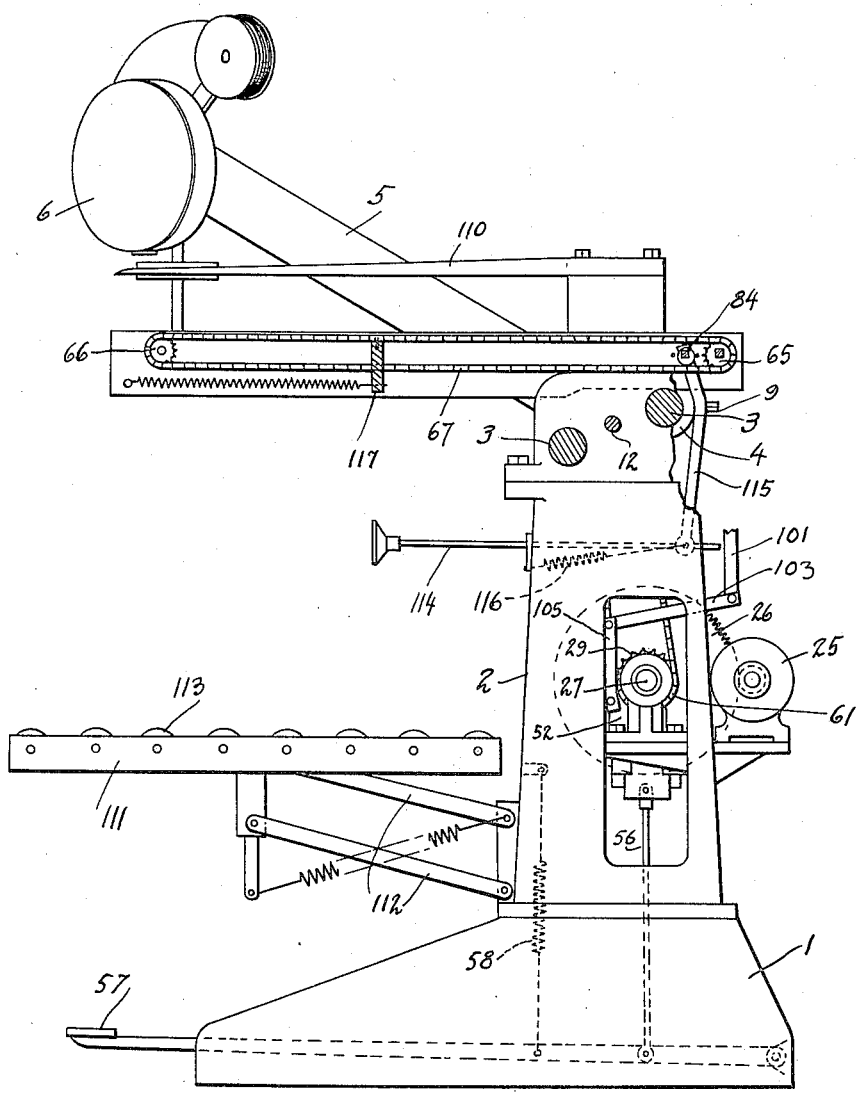

Fig. 15 is a side elevation of a machine of the double head type arranged for stitching a double row of stitches in the top of a container which may be filled with goods, and involving blade anvils.

The general frame construction of the two machines as is depicted in Figs. 1 and 15 are much the same. The frame construction comprises a suitable base 1 with an upright support or pedestal 2. This pedestal carries a pair of supporting bars 3, and carried by these supporting bars are what may be termed base members 4, each supporting hollow arms 5, which have, at their ends, stitcher heads 6. These stitcher heads may be of conventional construction and the details need not be described.

The members 4 are slidably adjustable on the arms 3, and for this purpose one supporting bar may be provided with a gear rack 7 (Fig. 5) and journaled in the members are pinions 8 meshing with the rack, said pinions being connected to adjusting studs 9, suitably shaped for receiving a tool such as a wrench or crank, and it will be observed that by applying a crank to studs 9 and rotating the same, that base members 4 and the stitcher heads may be adjusted toward or away from each other.

In order to maintain an adjustment a clamp or friction member 4a may be provided which is urged into engagement with the arm 3 by manipulation of the screw 4b. This will hold the adjustment and may be loosened to permit adjustment.

Extending across the machine is a power driven shaft 12 which is driven by means later to be described, and which has a sliding fit in the members 4. Mounted near the ends of this shaft are pinions 13 arranged to slide on the shaft; for this purpose a shaft may be square or splined or provided with a key way so as to drive the pinions yet to permit them to move lengthwise thereon. Meshing with these pinions are other pinions 14 each carried by a shaft 15 operatively connected with the stitcher head shaft 16 through intermeshing pinions 17. Accordingly, it will be seen that shaft 12 through the connections described operates the stitcher heads and at the same time adjustment is permitted.

Anvil arms 20 which are also supporting arms underlie the stitcher heads, and they are attached to the base supporting members 4, so as to move therewith in adjustment as by means of brackets 21. These anvil arms in addition to serving as anvils, also support the forms which are arranged to feed the blanks, but this construction will be later described.

The driving and controlling mechanism for supplying power to drive the stitcher heads may comprise a suitable motor 25 having a pinion which meshes with driving gear wheel 26. The drive shaft is shown at 27 and it is driven by the gear wheel 26 through a suitable clutch, which, as shown at 28, may comprise multiple discs alternately connected to the shaft and driving gear (Fig. 12). The shaft 27 is preferably hollow and has keyed thereto a sprocket 29. A novel clutch packing and operating arrangement is provided, and the arrangement consists of a coil spring 30 backed up by a collar 31 pinned to the shaft and acting to urge sleeve 32 along the shaft. Preferably there is an adjustment consisting of a ring 33 screw threaded on the sleeve against which the spring abuts, and which may be fixed by the set screw 34.

The spring 30 does not act directly upon the clutch to pack the discs together, but acts through a rocker or a lever in such a manner that a lever advantage is obtained for the spring. This is afforded by means of a rocker collar 36 pivoted to a link 37, in turn pivoted to the sprocket 29. This rocker collar has a central opening around the shaft sufficiently large to permit it to rock, and the sleeve 30 preferably has a button 38 which contacts with the rocker collar opposite its pivotal connection. A pin 39 is carried by the rocker collar, and it projects through an elongated slot 40 in the shaft, and engages a pin 41 within the hollow shaft and arranged to slide therein. A clutch flange 42 has a hub carrying a nut or collar 43, and this collar also has a cross pin 44 which projects through an elongated slot 45 in the shaft. The collar 43, for adjustment purposes, is preferably screw-threaded to the hub of the clutch flange, and may be fixed in set position by set screw 46.

Accordingly it will be seen that as the spring 30 rocks the member 36, a pin 39 pushes pin 41, which in turn contacts with and pushes pin 44 to thus pack the driving and driven members of the clutch together. The spring gains a lever advantage, which is determined by the distance between centers of the rocking mounting of the rocker arm 36, the pin 39, and the contact button 38. These operating parts rotate on the shaft, and the rocker collar and sleeve 32 may be tied together as by means of pin 47.

Accordingly, it will be seen that if the rocker collar 36 is rocked clockwise, as Fig. 12 is viewed, the packing spring 30 will be compressed and the clutch discs released. In order to do this the rocker collar may, and preferably is, provided with a knockout button 50, mounted on a stud 51 for engagement with a knockout plate 52. This plate as shown in Fig. 3 has a number of notches 53, a stud 54, and a beveled face 55. This plate is mounted to reciprocate, and is connected to a controlling rod 56, which in turn is connected to a foot lever 57 (Fig. 15) by a suitable pivotal connection; also a coil spring 58 serves to hold the foot lever and the plate 52 upwardly.

When it is desired to connect the clutch, the operator depresses foot lever 57 and this pulls the plate 52 down to the position shown in Fig. 3, tensioning the spring 58; the packing spring 30 now packs the clutch together and the sprocket 29 is rotated. It will be noted, with reference to Fig. 3, that the knockout stud 50 may rotate when the plate 52 is out of the way. To release the clutch, the operator releases the pressure from the foot lever and spring 58 causes the plate 52 to move upwardly from the position shown in Fig. 3 to that shown in Fig. 12; the knockout button 50 strikes the beveled face 55, and rides up the same, causing the rocker collar 36 to rock, compress the packing spring 30, and release the clutch. In order to overcome the momentum of the parts, notches 53 are provided, and the knockout button 50 bounces into and out of these recesses, and under normal operation finally comes to rest in one of them. In any event should the momentum of the parts carry the knockout button beyond the recesses, the button will strike stud 54, and cause the driven parts to come to rest. Thus the sprocket 29 always comes to rest at substantially the same location, and by this arrangement the stitcher heads, which are operatively connected with the sprocket 29 by connections previously described, are caused to come to rest in a predetermined position.

The drive shaft 12 (Fig. 3) has a sprocket 60, and a chain 61 connects sprockets 29 and 60 for operating the stitcher heads. It can be seen, therefore, that an operator has control over the stitcher heads and can cause them to operate by his control over the clutch through the means described. For supporting fiber board blanks underneath the stitcher heads, the arms 20 slidably carry forms 62. These forms are advantageously of channel like formation and the arms 20 have rollers 63 near their ends for supporting the forms while the rear ends of the forms may be provided with a single roller 64 adapted to move in a central track carried by the arms, with the result that the arms can reciprocate and the forms reciprocate on the arms. Sprockets 65 and 66 are carried by the arms (Figs. 1 and 7), over which run chain 67, and a bracket 68 attached to a form, extends around the supporting arms as shown in Fig. 9, and is attached to a chain by a suitable device such as a pin in conjunction with the screw 68a. A spring such as a coil spring 69 is hooked into one of the chains and attached to a stud 70 at its other end, which is carried by one of the arms 20. This spring tends normally to hold the forms in forward position, which position is shown substantially in Fig. 1. It will be seen that the forms can be pushed back into the machine with a movement from left to right shown in Fig. 7, and in this Fig. 7 substantially the rearmost position of the form is shown. The spring may be hooked into different links of the chain to effect adjustment.

Figure 5:
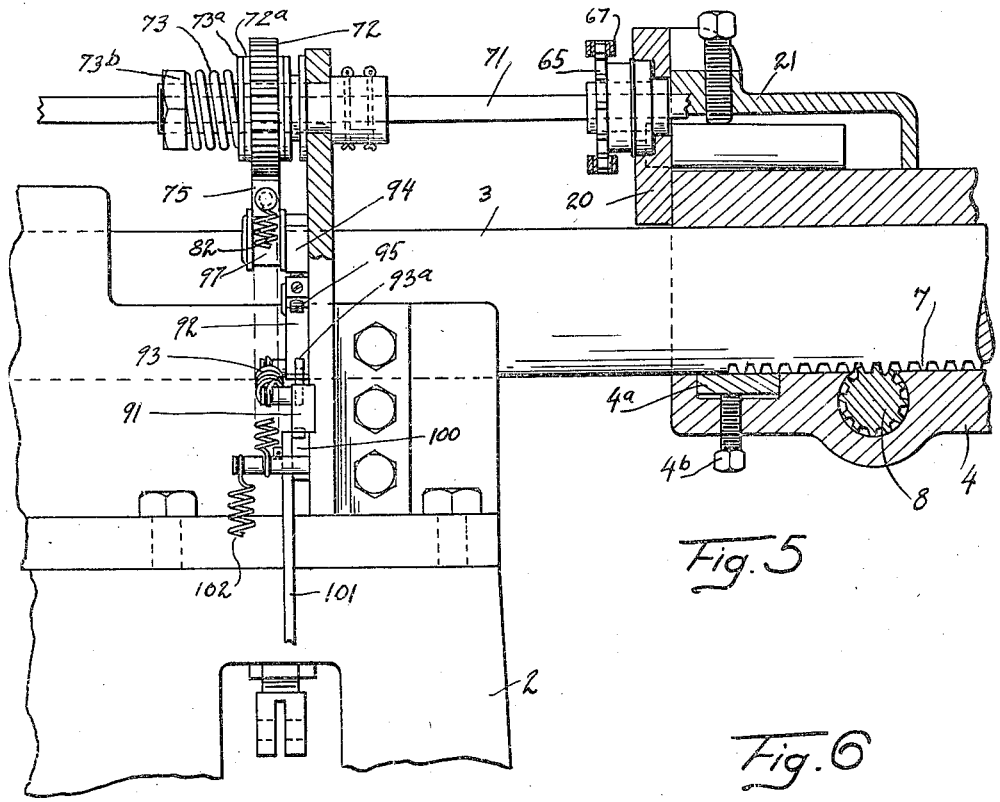
Fig. 5 is a sectional view taken on line 5—5 of Fig. 3, substantially, illustrating some of the feed mechanism and also the adjustment for the stitcher head.
Figure 6:
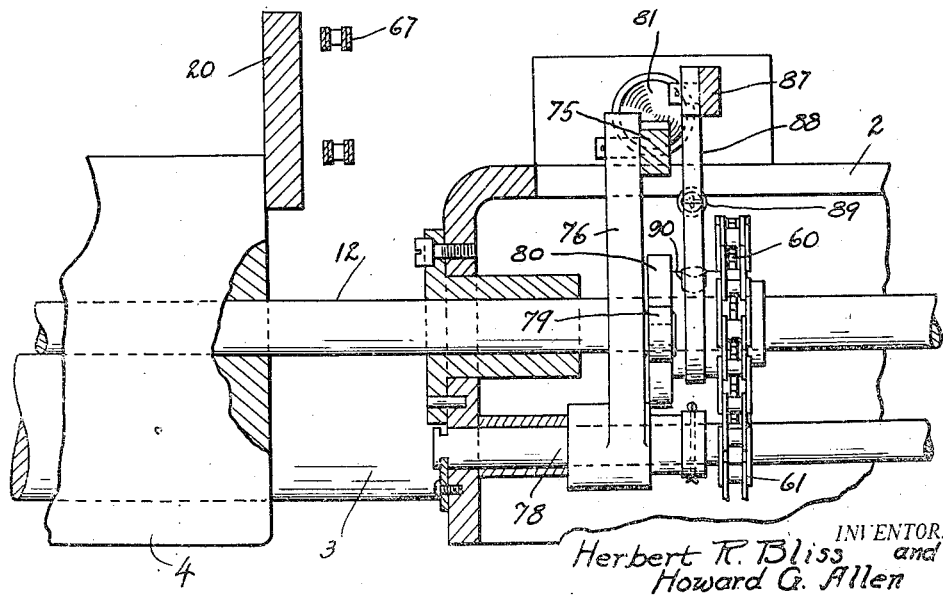
Fig. 6 is a sectional view taken on substantially line 6—6 of Fig. 3, also illustrating some of the feed mechanism.

One of the sprockets 65 is mounted upon a shaft 71, arranged to be driven with step by step movement. The mechanism for effecting this movement is shown in Figs. 3 and 5 and comprises a gear 72 loosely mounted on a shaft 71, and connected therewith by a friction drive connection. Spring 73 packs friction disc 73a which has a driving connection with the shaft against friction disc 72a which has a driving connection with the gear. Adjustment may be had by means of the nut 73b. A rack 75 is arranged to mesh with the gear 72, and one end of the rack is connected to a rocker arm 76 pivotally mounted at 78 having a roller 79 which engages an open cam 80 on the shaft 12, said engagement being effected by a spring 81. Accordingly, as the machine operates, the rocker arm 76 reciprocates the rack, and oscillates the gear 72 which drives shaft 71 in one direction, and slips in the other. The distance which the rack 75 moves in any one stroke may be adjusted by a stop stud 81 threaded into a suitable bracket carried by the frame of the machine, and arranged to stop the end of the rack in its driving movement. With reference to Fig. 3, it will be noted that when the rack is stopped by this stud, the lower face of the cam merely moves away from the engaging roller 79. The block 81 may, and preferably is, acted upon by a pressure plunger 98, backed up by spring 99, so that as the block is adjusted, as by means of turning enlarged portions 81a, it has sufficient friction to retain itself in any given position.

However, it is desirable, in taking rows of stitches in the making of a container that the step by step feed be not operated at all times so that individual stitches may be taken, and accordingly, the rack 75 is at times held disengaged from the gear 72, and engages the same only when it is properly tripped. A coil spring 82 normally holds the rack spaced from the gear. A trip arm 83 is mounted upon a rockshaft 84 and an engaging roller 85 is mounted upon one of the brackets 68 (Fig. 7); this roller engages a bevel face 86 on the trip arm when the forms 62 have been moved to a predetermined position. This rocks the shaft 84, and an arm 87 mounted thereon (Fig. 3) in a counter clockwise direction, thus lowering a pivoted link 88, held under tension of a spring 89. This link is positioned in the path of a stud 90, which is carried on the hub of sprocket 60, so that as it rotates it strikes the pivoted link 88 and rocks the same; link 88 when it is dropped by the tripping action its lower end lies adjacent one end of a slide 91, and as the link 88 is rocked, this slide is moved from left to right as Fig. 3 is viewed. When this occurs a small bell crank 92 is rocked counter clock-wise through the action of a spring 93, and this bell crank raises a pivoted arm 94 through the means of an adjusting screw 95, which in turn has a roller 97, which engages the rack 75 and lifts it into meshing relation with the gear. Crank 92 normally abuts stop 93a on slide 91.

The slide 91 is held in the above position by a latch 100 connected to a link 101 acted upon by spring 102. There is a lever 103 under the control of the operator to which the lower end of the link 101 is connected by means of a slot and pin connection 104. The lever 103 may be rocked through the means of a link 105 connected to stop pin 54 on the controlling plate 52.

The operation of this mechanism with a supplemental description of parts is as follows:

As shown in Fig. 3 the clutch controlling plate 52 is lowered and the machine is operating, and the step by step feed mechanism is shown in an operative position. Prior to the tripping of the arm 83 the rack 75 is not in engagement with the gear 72, and as the sprocket 60 rotates, the stud 90 strikes the link 88 on each revolution, but the link is ineffective. Accordingly, individual stitches may be taken in blanks without a feeding movement and at any place on the blank as may be desired by the operator. The blanks it will be understood are supported by the forms 62 (Fig. 1). To take a row of stitches the operator pushes forms 62 into the machine with the blanks thereon (this is a movement which is upward as Fig. 1 is viewed) until the roller 85 rocks the arm 83; this drops the link 88 and when it is engaged by the stud 90, it moves the slide 91 over to the position shown in Fig. 3. The spring 93 is stronger than spring 82. Accordingly, the arm 94 is lifted and the rack caused to engage with the gear, while the latch 100 holds the parts in the position shown, so long as the operator keeps the pedal 57 depressed. Spring 102 holds the latch 100 in its holding position, which action is permitted by the loose connection 104. However, when the operator releases the foot lever to stop the machine, lever 103 rocks clockwise and withdraws latch 100, whereupon the slide 91 moves back to its normal position, and the rack becomes disengaged from the gear by movement of the parts reverse to that just described, as will be well understood. When the slide 91 is moved from left to right into the position as shown in Fig. 3, the clutch is always engaged by the previous withdrawal of the controlling plate 52, and accordingly the lever 103 has been rocked counter clockwise so that if it were not for the loose connection 104, the link 101 would be held positively fixed so that it could not function with dog 100 to latch the slide 91. However, the loose play permits the latch to rock irrespective of the lever 103 and under the action of spring 102. If the teeth on the rack 75 and gear 72 do not mesh properly no damage results because spring 93 gives way.

Accordingly, it will be appreciated that an operator may take individual stitches in blanks, placing them wherever desired. For example, blanks may be laid upon the forms 62, and one or more stitches may be taken to initially position the blanks with respect to each other, and during this time all of the parts are operating except that the rack 75 reciprocates, but does not mesh with the gear 72. When the blanks are pushed into the machine the arm 83 is tripped and this, through the mechanism above described, and shown in Fig. 3, causes rack 75 to engage gear 72. The one way drive connection of this gear, with the shaft 71, drives the chains 67 with step by step movement and it follows that the forms 62 are also thus driven by reason of their connection with the chains. Accordingly the blanks held on the forms move in step by step manner underneath the stitcher heads, and during this time the stitcher heads are operating. The parts are so timed that the stitcher heads throw stitches between the step by step movements. The stitches are thrown against the anvils proper 20a which may be hardened pieces of metal carried by the arms 20.

The machine shown in Fig. 15 is one designed for the sealing of a top of a filled container, and for this purpose employs blade anvils 110 instead of the anvil arms, as are employed in the type of machine shown in Fig. 1. Both machines have the double heads however. Also a work table 111 is used on which the container is placed, the table being adjustably held by supporting levers 112, details of which form no part of the present invention, except in combination with the other parts and need not be described. This machine may employ the same mechanism as that employed in the machine above described so far as the clutch and the drive construction and step by step mechanism is concerned. No sliding forms are needed, because the case itself can be moved in towards the base of the machine on the rollers 113, of the work table. A plunger 114 is provided, and it is connected as by means of an arm 115 to the rock shaft 84 for tripping the step by step mechanism. A spring 116 may be employed for holding the plunger, and an arm 115, in normal position. The feed chains 67 are used, which are driven by the step by step mechanism, and they are spaced outside the plane of the blade anvils for receiving a box between them, and instead of having movable supporting forms for blanks, there is merely a cross rod 117 connecting the chains which engages the side of the filled container and moves it outwardly from the pedestal of the machine with step by step movement. The principle of blade anvils is well understood, it being sufficient to say that the blades 110 are positioned between the body of the box and top flap of the container, and the stitches are thrown against the blade and finally after the last stitch is taken, the blade is removed from between the stitched parts.

The outward movement of the forms 62 is limited preferably by a buffer. This buffer may take the form of a plunger 125 backed up by a spring 126 both contained in a housing 127. This stop is adjustable so as to limit the movement of the forms to permit adjustment for various sized blanks. For this purpose the stop is adjustably carried by an arm 20, the construction of which may vary. It is to be pointed out that as a safety feature the friction driving clutch which comprises the friction discs 72a and 73a slip when the forms are stopped by this abutment in the event that the operator fails to stop machine operation so that there will be no breakage of parts.

We claim:

1. A stitching machine comprising, a supporting pedestal or the like, stitcher head supporting means projecting from opposite sides of the pedestal, a stitcher head carried by each of the said supporting means, a gear rack on the said supporting means, a pinion associated with the stitcher head and meshing with the gear rack, means operable to rotate the pinion to adjust the stitcher heads with respect to the supporting means, a drive shaft substantially paralleling the supporting means, mechanism for operating the stitcher heads, and slidable connections between the drive shaft and stitcher head operating mechanism.

2. A stitching machine comprising, a pedestal or the like, a pair of supporting rods projecting from each side of the pedestal, a housing on each side of the pedestal carried slidably by the said rods, a stitcher head carried by each housing, a stitcher head operating mechanism enclosed in part by each housing including a shaft, a drive shaft paralleling the supporting arms and extending through the housings, pinions operatively connecting the drive shaft and the stitcher head operating shaft, the pinions on the drive shaft being slidable thereon, and means for adjusting the housings toward and away from each other on the said supporting rods.

3. The combination with a stitcher head or the like, of means for moving an article to be stitched with a step-by-step movement with respect to the stitcher head comprising, an operating shaft, a gear thereon, a one-way drive connection between the gear and shaft, a gear rack, means for reciprocating the gear rack, the said gear rack being normally held away from the gear, and means for moving the gear rack into meshing relation with said gear.

4. The combination with a stitcher head or the like, of means for moving an article to be stitched with a step-by-step movement with respect to the stitcher head comprising, an operating shaft, a gear thereon having a one-way drive connection with said shaft, a gear rack normally spaced from the gear, means for reciprocating the rack, manually controlled means for setting the stitcher head and reciprocating means into action, a trip actuated by manual movement of the article to be stitched into a pre-determined position, and means associated with the trip for moving the reciprocating gear rack into meshing relation with the gear.

5. The combination with a stitcher head or the like, of means for moving an article to be stitched with a step-by-step movement with respect to the stitcher head comprising, an operating shaft, a gear thereon having a one-way drive connection with said shaft, a gear rack normally spaced from the gear, means for reciprocating the rack, manually controlled means for setting the stitcher head and reciprocating means into action, a trip actuated by manual movement of the article to be stitched into a pre-determined position, means associated with the trip for moving the reciprocating gear rack into meshing relation with the gear, means for holding the gear rack locked in meshing position after actuation of the trip, and means operatively associated with the manually controlled means for releasing the gear rack upon movement of the manually controlled means to stop the stitcher head and reciprocating mechanism.

6. A step-by-step feeding mechanism for a stitching machine or the like comprising, a shaft, a gear thereon with a slip drive connection, a gear rack associated with the gear, means for reciprocating the rack including an open faced cam for moving the rack in one direction, a spring for moving the rack in the opposite direction, and an adjustable stop for limiting movement of the rack under action of said spring.

7. A step-by-step feeding mechanism for a stitching machine or the like comprising, a shaft, a gear thereon with a one-way drive connection, a gear rack associated with the gear, means for reciprocating the rack including an open faced cam for moving the rack in one direction, a spring for moving the rack in the opposite direction, and an adjustable stop for limiting movement of the rack under action of said spring, the one-way drive connection being such that the drive is effective upon rack movement under action of the cam and inactive upon rack movement under action of the spring.

8. A step-by-step feeding mechanism for a stitching machine or the like comprising a shaft, a gear thereon, a slip drive connection between the gear and the shaft, a gear rack, means for reciprocating the gear rack, said gear rack being normally spaced from the gear, and means for moving the gear rack into engagement with the gear including a spring element arranged to give way upon improper meshing of the gear teeth.

9. A feeding mechanism for stitching machines or the like comprising an endless chain running over sprockets, means associated with the chain for moving an article to be stitched, a spring for holding the chain in a normal position, said spring being flexed as the chain is moved over the sprocket by manual movement of the article, and means for moving the chain with step-by-step movement in reverse direction over the sprockets for moving the article with step-by-step movement.

10. A stitching machine comprising, a supporting pedestal or the like, stitcher head supporting means projecting from opposite sides of the pedestal, a stitcher head carried by each of the said supporting means, a gear rack on the said supporting means, a pinion associated with the stitcher head and meshing with the gear rack, means operable to rotate the pinion to adjust the stitcher heads with respect to the supporting means, a drive shaft substantially paralleling the supporting means, mechanism for operating the stitcher heads and slidable connections between the drive shaft and stitcher head operating mechanism, and clamping means for effecting a clamp action between the supporting means and stitcher head for maintaining the two in given adjustment.

In testimony whereof we have affixed our signatures.

HERBERT R. BLISS.
HOWARD G. ALLEN.